(12) United States Patent   (10) Patent No.: US 10,096,202 B2
Castro et al.                    (45) Date of Patent:       Oct. 9, 2018

(54) CASINO MACHINE HAVING EMOTIVE LIGHTING STRUCTURES

(71) Applicant: Bally Gaming, Inc., Las Vegas, NV (US)

(72) Inventors: Christian L. Castro, Chicago, IL (US); Nicholas M. Garoufalis, Lake Forest, IL (US); Robert J. Glenn, II, Chicago, IL (US); Paul M. Lesley, Blue Island, IL (US); Timothy C. Loose, Chicago, IL (US); Brian J. Goldstein, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 86 days.

(21) Appl. No.: 15/215,384

(22) Filed: Jul. 20, 2016

(65) Prior Publication Data

US 2016/0364946 A1    Dec. 15, 2016

Related U.S. Application Data

(63) Continuation-in-part of application No. 14/735,931, filed on Jun. 10, 2015.

(51) Int. Cl.
  *G07F 17/32* (2006.01)
  *F21V 8/00* (2006.01)
  (Continued)

(52) U.S. Cl.
  CPC ......... *G07F 17/3216* (2013.01); *G02B 5/021* (2013.01); *G02B 6/0096* (2013.01);
  (Continued)

(58) Field of Classification Search
  CPC .......................... G07F 17/322; G02B 6/0096
  See application file for complete search history.

(56) References Cited

U.S. PATENT DOCUMENTS 2,383,469 A   8/1945   Colbert
3,440,431 A   4/1969   Cicchiello
(Continued)

FOREIGN PATENT DOCUMENTS

JP   2008-012342   1/2008
JP   2008-079781   4/2008
(Continued)

OTHER PUBLICATIONS

PCT International Search Report for International Application No. PCT/US2009/061128 dated Dec. 2, 2009 (2 pages).
(Continued)

*Primary Examiner* — Jason Skaarup
(74) *Attorney, Agent, or Firm* — Marvin A. Hein

(57) ABSTRACT

A gaming machine includes a gaming cabinet, an electronic display device, a masked area, a light source, and a diffused lighting area. The display device is within a cabinet enclosure and has an active area with an image surface, which is defined by a plurality of active edges and is configured to display images of a casino wagering game. The masked area is adjacent to the active area and lacks any display of the images of the casino wagering game. The light source is concealed from view relative to a player position and emits an initial light. The diffused lighting area is adjacent to the masked area, extends to overlap the adjacent peripheral edge of the cabinet enclosure, and includes a single diffuser that receives the initial light and transmits it towards the player.

16 Claims, 19 Drawing Sheets

(51) Int. Cl.
  *G02B 5/02* (2006.01)
  *F21V 33/00* (2006.01)
  *F21W 131/40* (2006.01)
  *F21Y 115/10* (2016.01)

(52) U.S. Cl.
  CPC ........ *G07F 17/3211* (2013.01); *F21V 33/008* (2013.01); *F21W 2131/40* (2013.01); *F21Y 2115/10* (2016.08)

(56) References Cited

U.S. PATENT DOCUMENTS

| | | | |
|---|---|---|---|
| 5,534,940 A | | 7/1996 | Sato |
| 5,916,450 A | | 6/1999 | Muggli |
| 6,439,731 B1 | * | 8/2002 | Johnson ............ G02F 1/133603 |
| | | | 349/61 |
| 6,564,108 B1 | | 5/2003 | Makar |
| 6,611,297 B1 | | 8/2003 | Akashi |
| 6,656,041 B1 | | 12/2003 | Kaminkow |
| 6,656,048 B2 | | 12/2003 | Olsen |
| 6,695,703 B1 | | 2/2004 | McGahn |
| 6,778,226 B1 | | 8/2004 | Eshelman |
| 6,800,030 B2 | | 10/2004 | Acres |
| 6,945,685 B1 | | 9/2005 | Sokolov |
| 6,976,915 B2 | | 12/2005 | Baker |
| 7,072,849 B1 | | 7/2006 | Filepp |
| 7,324,080 B1 | | 1/2008 | Hu |
| 7,396,282 B2 | | 7/2008 | Gauselmann |
| 7,682,249 B2 | | 3/2010 | Winans |
| 7,811,170 B2 | | 10/2010 | Winans |
| 7,841,947 B2 | | 11/2010 | Gauselmann |
| 7,864,204 B2 | | 1/2011 | Overes |
| 7,894,000 B2 | | 2/2011 | Gutta |
| 8,012,021 B2 | | 9/2011 | Crowder, Jr. |
| 8,154,669 B2 | | 4/2012 | Wang |
| 8,177,390 B2 | | 5/2012 | Miskin |
| 8,262,457 B2 | | 9/2012 | Ansari |
| 8,353,766 B2 | * | 1/2013 | Okada ................ G07F 17/3211 |
| | | | 273/138.1 |
| 8,550,913 B2 | | 10/2013 | Kelly |
| 8,847,849 B2 | * | 9/2014 | Lee .................... G02B 6/0055 |
| | | | 345/5 |
| 2002/0173354 A1 | | 11/2002 | Winans |
| 2003/0002246 A1 | | 1/2003 | Kerr |
| 2003/0043314 A1 | | 3/2003 | Lee |
| 2003/0076281 A1 | | 4/2003 | Morgan |
| 2003/0076670 A1 | | 4/2003 | Siegel |
| 2003/0166417 A1 | | 9/2003 | Moriyama |
| 2003/0195045 A1 | | 10/2003 | Kaminkow |
| 2004/0036622 A1 | | 2/2004 | Dukach |
| 2004/0038726 A1 | | 2/2004 | Inoue |
| 2004/0125234 A1 | | 7/2004 | Kim |
| 2004/0136189 A1 | | 7/2004 | Vanderschuit |
| 2004/0181989 A1 | | 9/2004 | Miller |
| 2004/0185938 A1 | | 9/2004 | Moore |
| 2004/0209681 A1 | * | 10/2004 | Emori ................ G07F 17/3211 |
| | | | 463/31 |
| 2004/0219965 A1 | * | 11/2004 | Okada ................ G07F 17/3202 |
| | | | 463/16 |
| 2004/0227866 A1 | * | 11/2004 | Okada ................... G07F 17/32 |
| | | | 349/58 |
| 2005/0085292 A1 | | 4/2005 | Inamura |
| 2005/0128751 A1 | | 6/2005 | Roberge |
| 2005/0130732 A1 | | 6/2005 | Rothschild |
| 2005/0153780 A1 | | 7/2005 | Gauselmann |
| 2005/0261057 A1 | | 11/2005 | Bleich |
| 2006/0063591 A1 | | 3/2006 | Gauselmann |
| 2007/0021204 A1 | | 1/2007 | Eloff |
| 2007/0041094 A1 | | 2/2007 | Dominguez-Montes |
| 2007/0093290 A1 | | 4/2007 | Winans |
| 2007/0103918 A1 | | 5/2007 | Lin |
| 2007/0164975 A1 | | 7/2007 | Lim |
| 2007/0165406 A1 | | 7/2007 | Wang |
| 2007/0287528 A1 | | 12/2007 | Hirato |
| 2008/0039213 A1 | | 2/2008 | Cornell |
| 2008/0062700 A1 | | 3/2008 | Hayashi |
| 2008/0096655 A1 | * | 4/2008 | Rasmussen ........ G07F 17/3202 |
| | | | 463/31 |
| 2008/0129662 A1 | | 6/2008 | Yoo |
| 2008/0207303 A1 | | 8/2008 | Rasmussen |
| 2008/0268942 A1 | | 10/2008 | DeRuyter |
| 2009/0045723 A1 | | 2/2009 | Ishikawa |
| 2009/0046455 A1 | | 2/2009 | Yoshino |
| 2009/0149242 A1 | | 6/2009 | Woodard |
| 2009/0174346 A1 | | 7/2009 | Hwang |
| 2010/0053229 A1 | | 3/2010 | Krijn |
| 2010/0097408 A1 | | 4/2010 | Marcellinus |
| 2010/0227667 A1 | | 9/2010 | Englman |
| 2010/0238664 A1 | | 9/2010 | Steenbergen |
| 2011/0118034 A1 | | 5/2011 | Jaffe |
| 2011/0201411 A1 | | 8/2011 | Lesley |
| 2012/0286651 A1 | * | 11/2012 | Levermore ............ H05B 33/10 |
| | | | 313/504 |
| 2014/0231788 A1 | * | 8/2014 | Krall .................... H01L 27/3239 |
| | | | 257/40 |
| 2016/0164043 A1 | * | 6/2016 | Ma .......................... H01L 51/56 |
| | | | 438/28 |
| 2017/0288175 A1 | * | 10/2017 | Ma .......................... H01L 51/56 |

FOREIGN PATENT DOCUMENTS

| | | |
|---|---|---|
| JP | 2008-086589 | 4/2008 |
| WO | WO 2001/034262 | 5/2001 |
| WO | WO 2002/091319 | 11/2002 |
| WO | WO 2004/075128 | 9/2004 |
| WO | WO 2004/075129 | 9/2004 |
| WO | WO 2006/036486 | 4/2006 |
| WO | WO 2009/061457 | 5/2009 |

OTHER PUBLICATIONS

PCT International Written Opinion for International Application No. PCT/US2009/061128 dated Dec. 2, 2009 (5 pages).

* cited by examiner

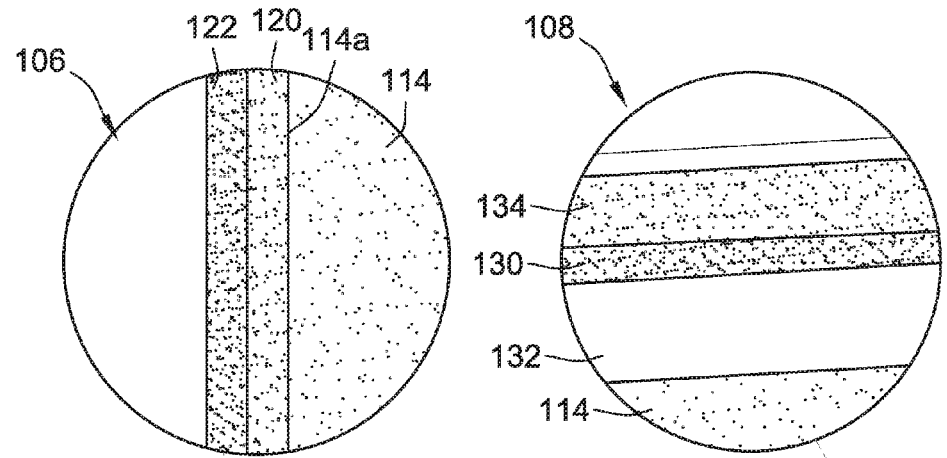
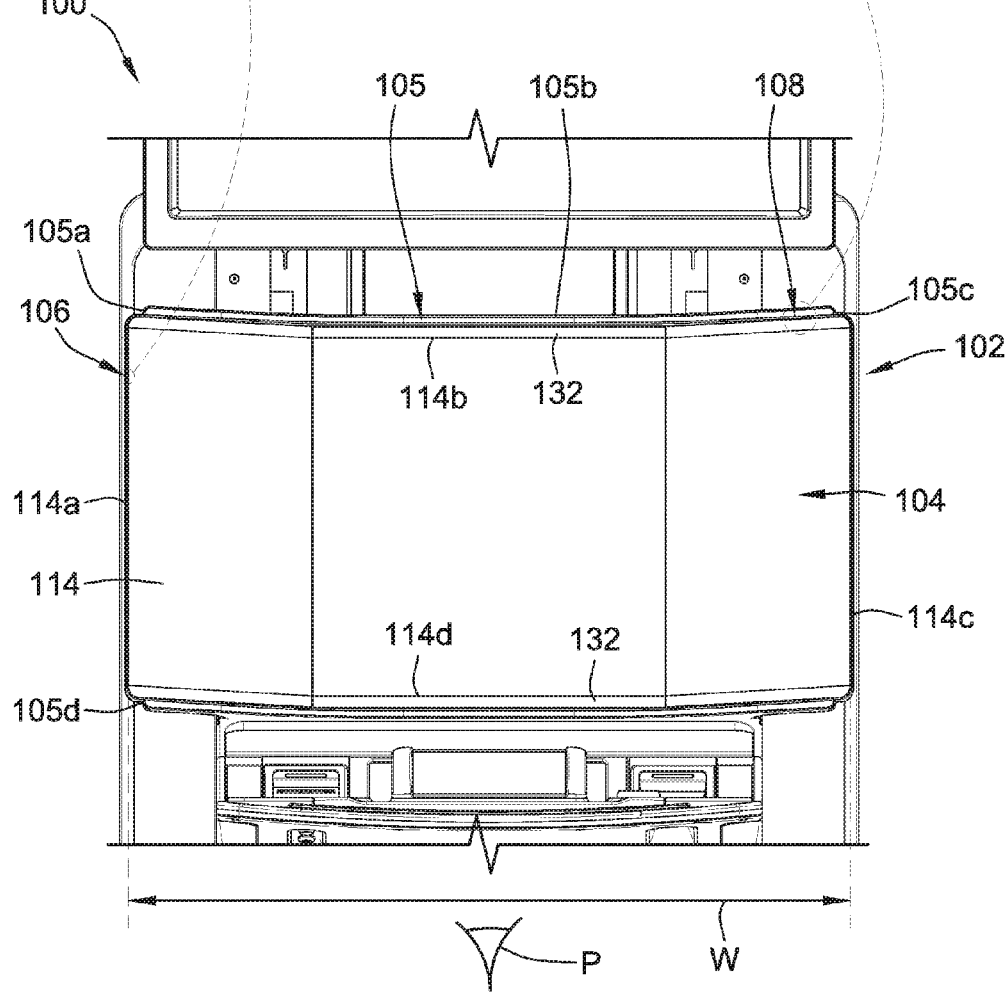
FIG. 4B
FIG. 4C
FIG. 4A

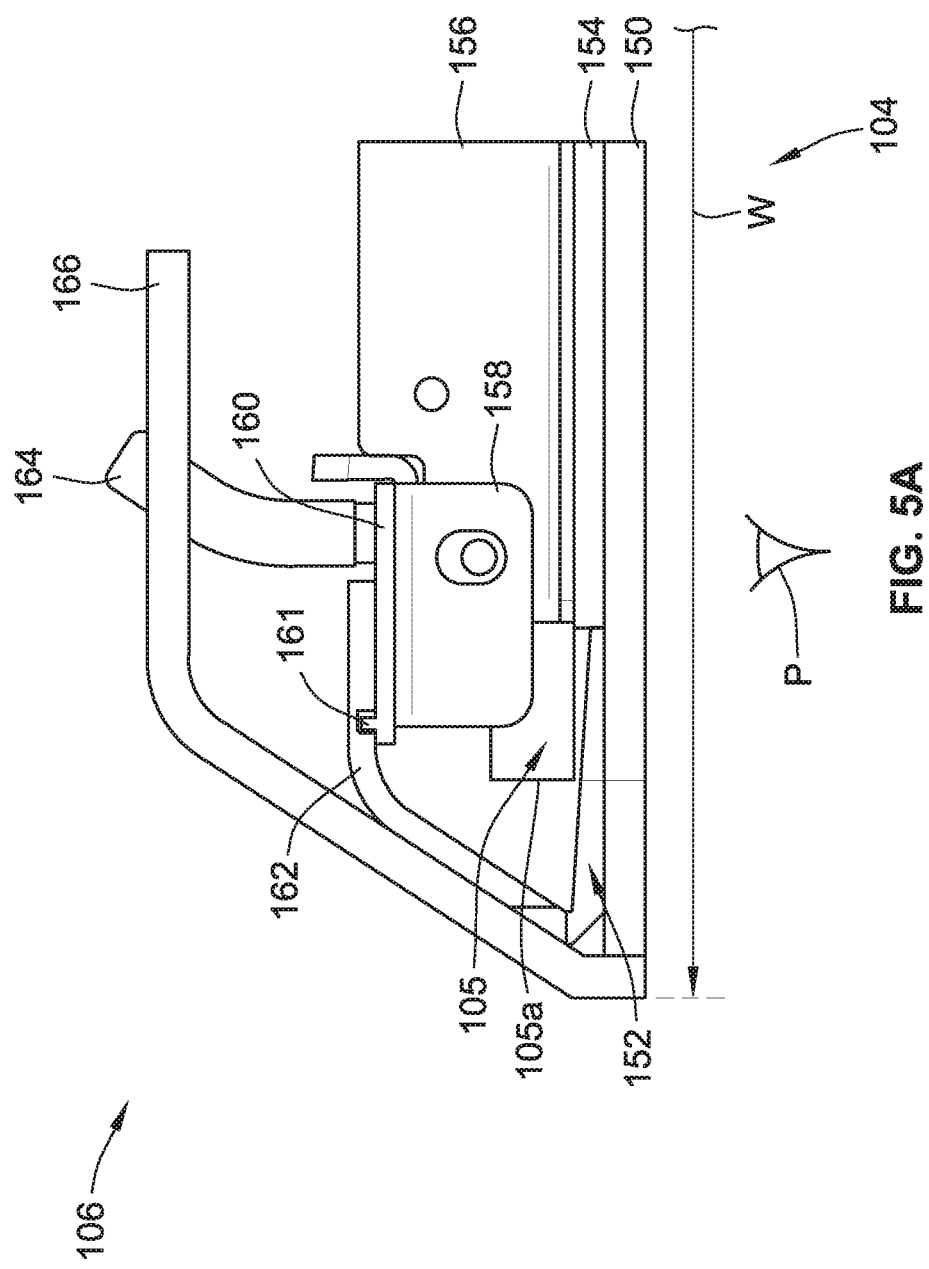

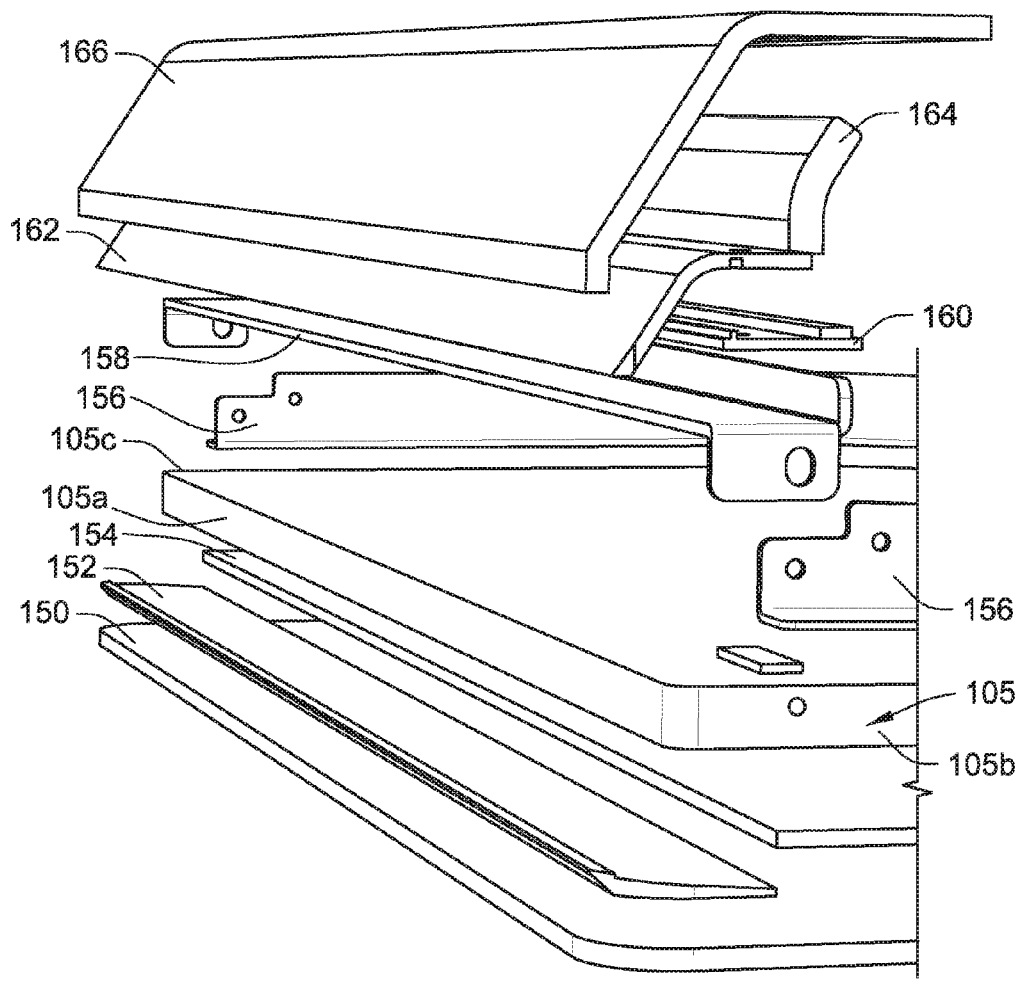
FIG. 6
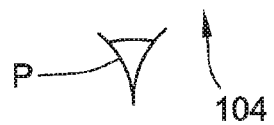

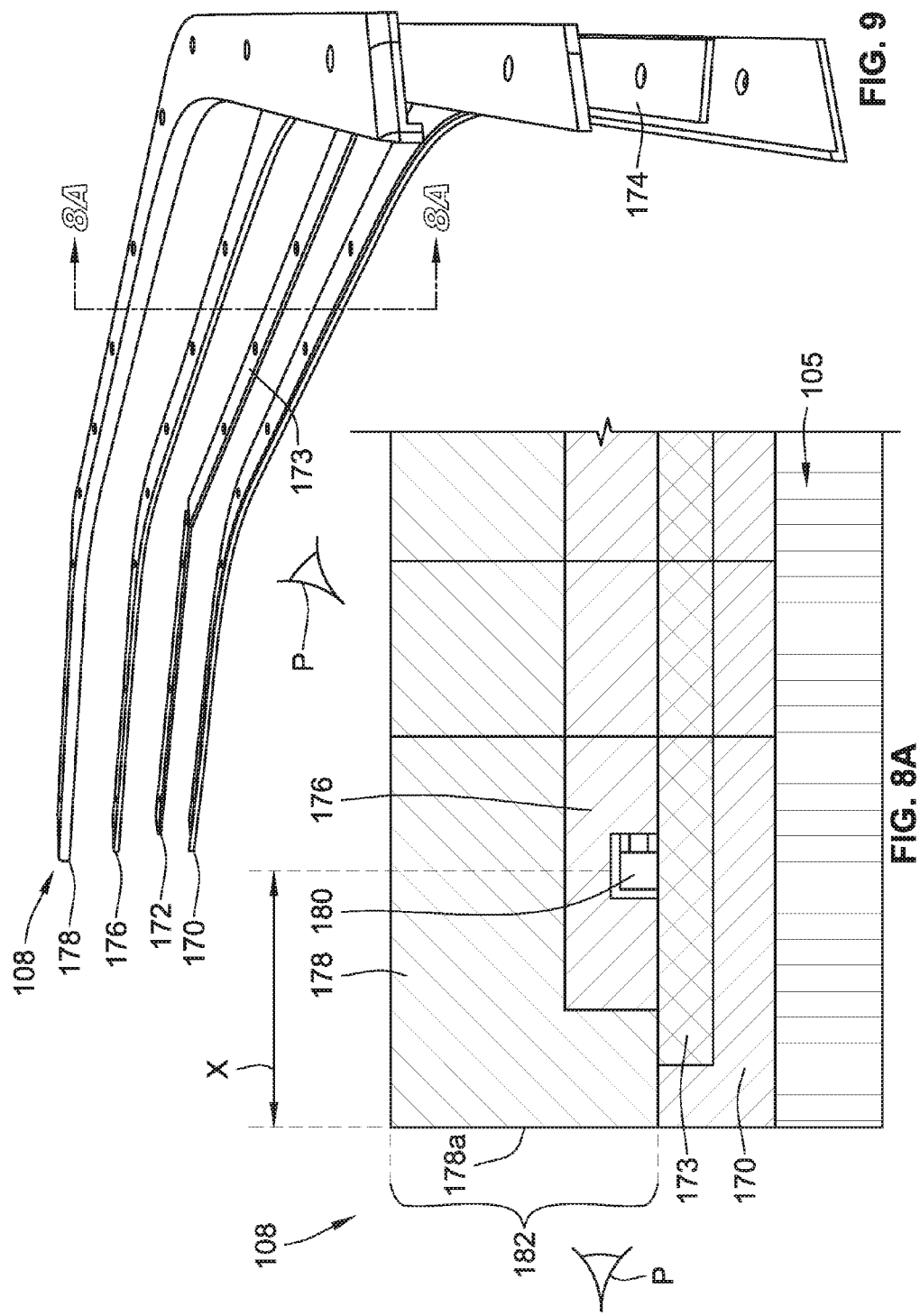

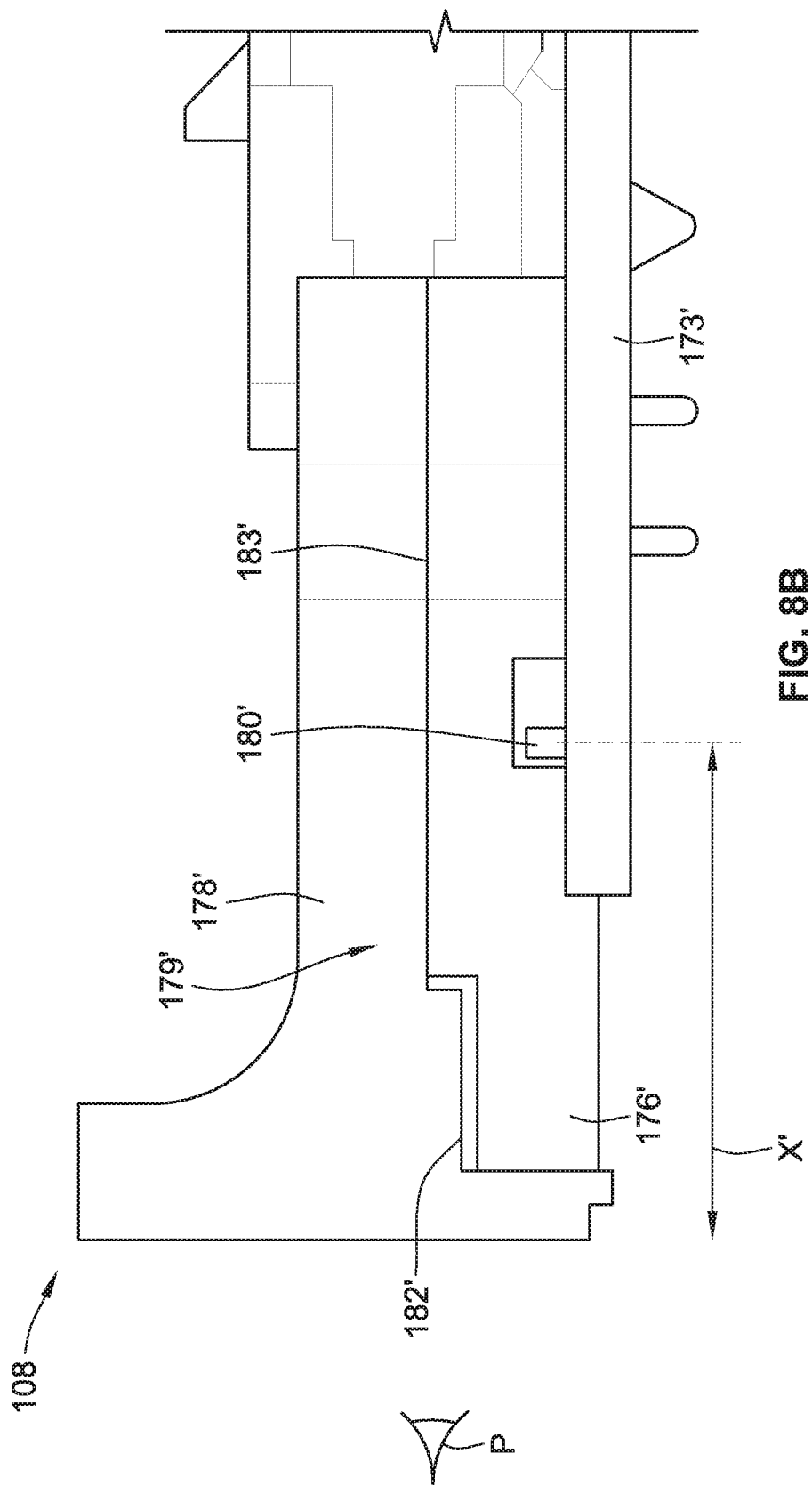

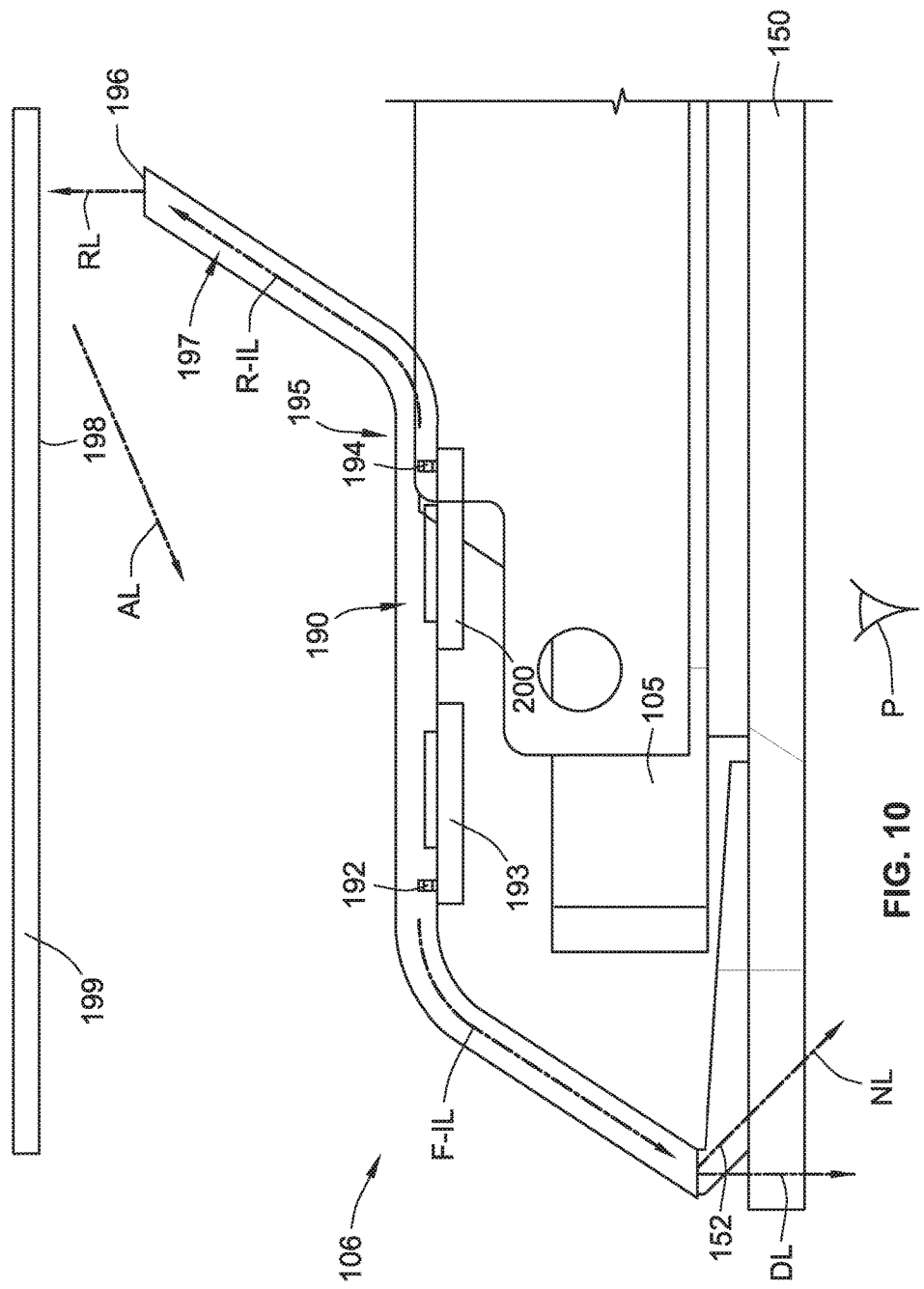

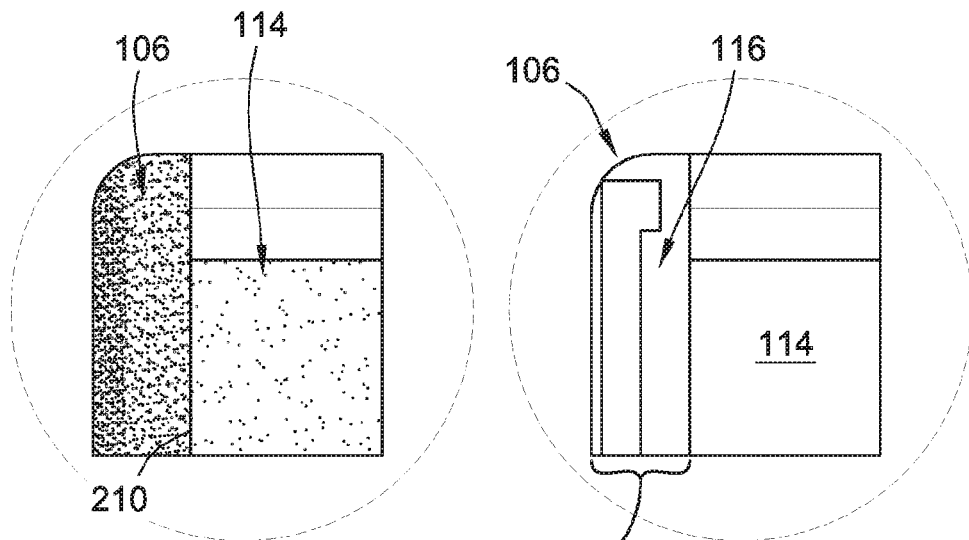
FIG. 11B  FIG. 11C
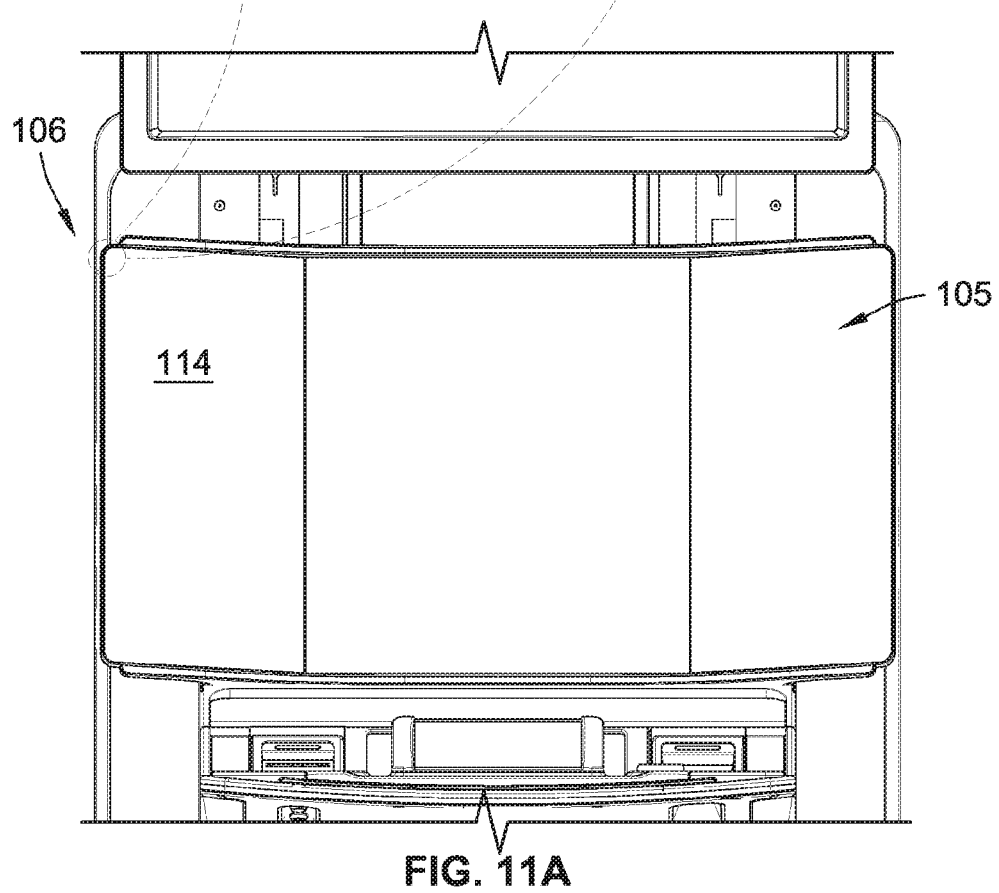
FIG. 11A

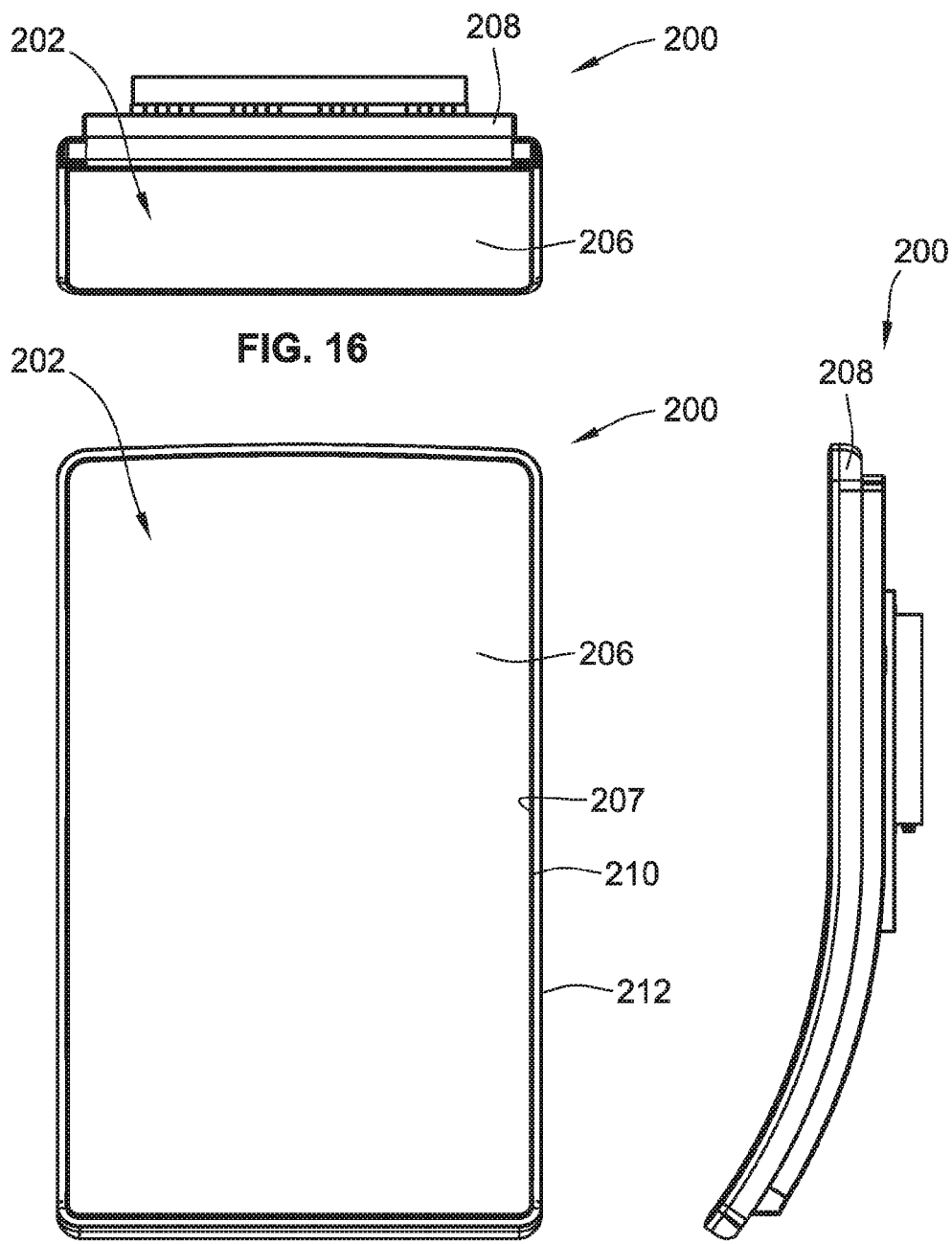

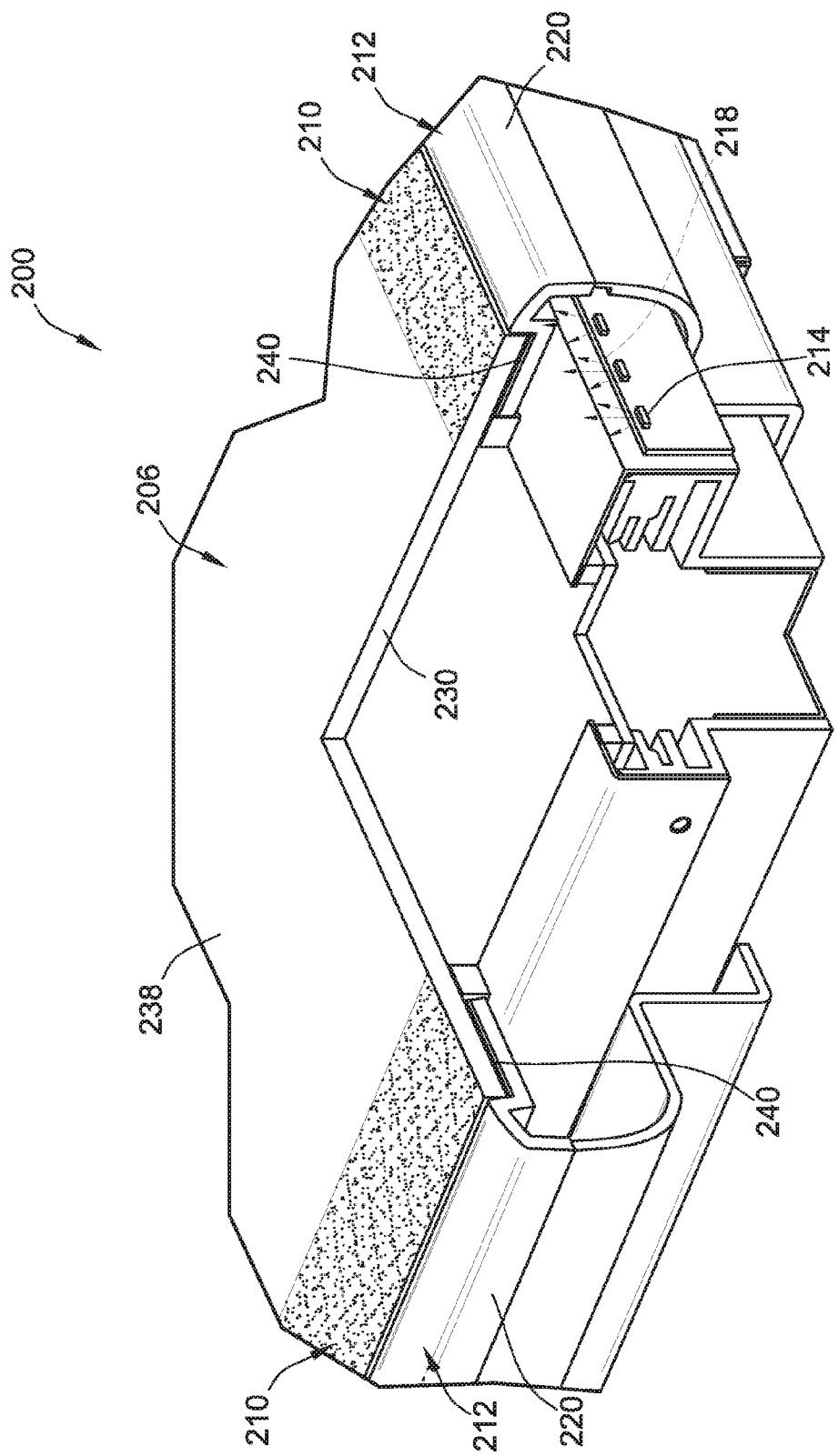

CASINO MACHINE HAVING EMOTIVE LIGHTING STRUCTURES

CROSS-REFERENCE TO RELATED APPLICATION

This application is a continuation-in-part of U.S. patent application Ser. No. 14/735,931, filed on Jun. 10, 2015, for a "Casino Machine Having Emotive Lighting Structures," which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a casino machine having an emotive lighting structure for creating a masked area between an active area and a diffused lighting area.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to one aspect of the present invention, a gaming machine includes a gaming cabinet having a cabinet enclosure with a peripheral edge, and an electronic display device within the cabinet enclosure. The electronic display device has an active area with an image surface, the image surface being defined by a plurality of active edges and configured to display images of a casino wagering game. The gaming machine also includes a masked area adjacent to the active area and lacking any display of the images of the casino wagering game, and a light source concealed from view relative to a player position in front of the gaming cabinet and emitting an initial light. The gaming machine further includes a diffused lighting area adjacent to the masked area and extending to overlap the adjacent peripheral edge of the cabinet enclosure, the diffused lighting area including a single diffuser that receives the initial light and transmits it towards the player.

According to another aspect of the invention, a gaming machine includes a gaming cabinet with a peripheral edge, and an electronic display device within the cabinet. The display device includes an active area configured to display images of a casino wagering game. The gaming machine also includes a masked area immediately adjacent to the active area and forming at least in part an imageless, opaque border around the active area. A glass component has a common surface overlapping both the active area and the masked area. The gaming machine further includes a single diffuser forming a diffused lighting area and extending between the glass component and the adjacent peripheral edge of the gaming cabinet, the single diffuser having a first surface that extends in an overlapping manner below the glass component and a second surface that is at least in part elevated relative to the common surface of the glass component.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 4A is a partial front view of a gaming machine with an electronic display device adjacent to lighting areas, according to an embodiment of the present invention.

FIG. 4B is an enlarged view of a vertical lighting area illustrated in FIG. 4A.

FIG. 4C is an enlarged view of a horizontal lighting area illustrated in FIG. 4A.

FIG. 5A is a top view illustration of the vertical lighting area illustrated in FIG. 4B.

FIG. 6 is an exploded front-perspective view illustration of the vertical lighting area of FIG. 5 and other display components.

FIG. 8A is a side cross-sectional view along lines "8-8" of FIG. 9 illustrating a contour lighting area, according to one embodiment of the present invention.

FIG. 8B is a side cross-sectional illustration representative of an alternative configuration of a contour lighting area, according to one embodiment of the present invention.

FIG. 9 is an exploded perspective view of components illustrated in FIG. 8A.

FIG. 10 is a top view illustration of a two-way lighting area, according to an embodiment of the present invention.

FIG. 11A is a partial front view of a gaming machine with an electronic display device and having a seamless integrated emotive lighting area, according to an embodiment of the present invention.

FIG. 11B is an enlarged view of the emotive lighting area of FIG. 11A illustrating lighting directly adjacent to an active area of the electronic display device.

FIG. 11C is an enlarged view of the emotive lighting area of FIG. 11A illustrating components of the emotive lighting area.

FIG. 14 is a front view of the display shown in FIG. 13A.

FIG. 15 is a side view of the display shown in FIG. 13A.

FIG. 16 is a top view of the display shown in FIG. 13A.

FIG. 18 is a left partial cross-sectional illustration of the display shown in FIG. 13A.

Figure 1:
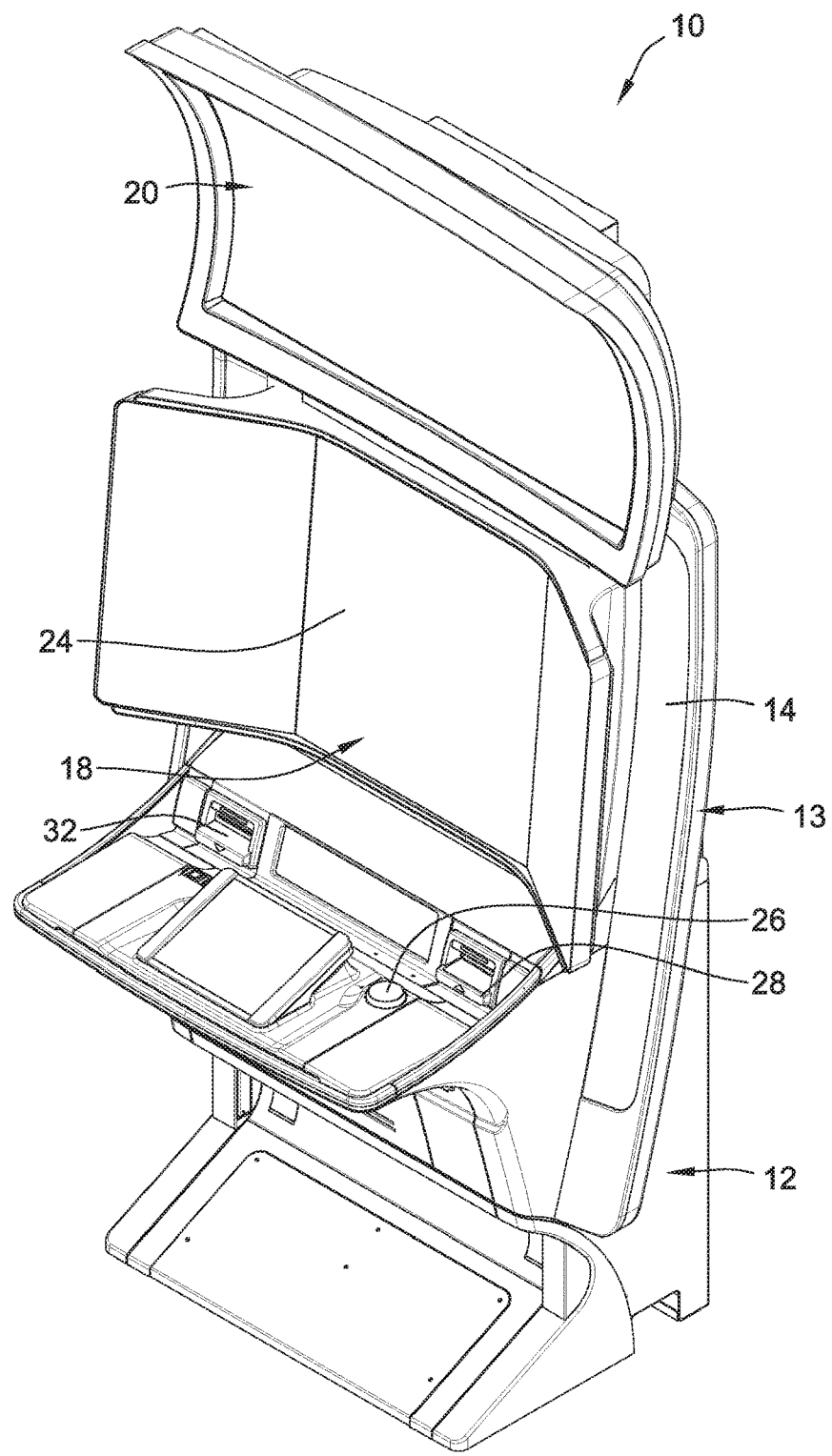
FIG. 1 is a perspective view of a free-standing gaming machine, according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 optionally forms an alcove configured to store one or more beverages or personal items of a player. A notification mechanism, such as a candle or tower light, is optionally mounted to the top of the cabinet 12. It flashes to alert an attendant that change is needed, a hand pay is requested, or there is a potential problem with the gaming machine 10. The gaming cabinet 12 optionally includes a rear wing 13 having a front surface 14 that is positioned rearward of a primary display 18.

The input devices, output devices, and input/output devices are disposed on, and securely coupled to, the cabinet 12. By way of example, the output devices include the primary display 18, a secondary display 20, and one or more audio speakers. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, one or more buttons 26 on a button panel and/or other player-input devices, a bill/ticket acceptor 28, a card reader/writer and/or ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit cash or credits onto the gaming machine 10. The cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. The value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
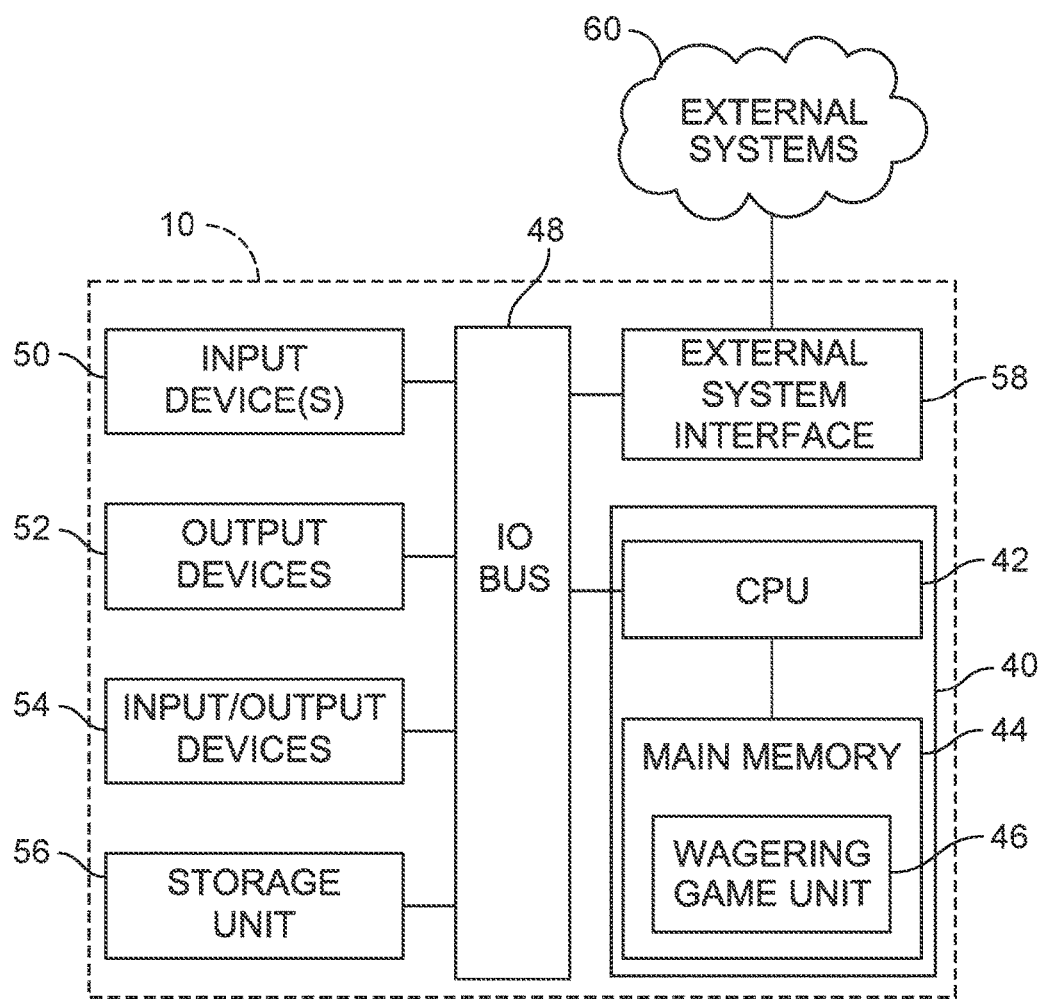
FIG. 2 is a schematic view of a gaming system, according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
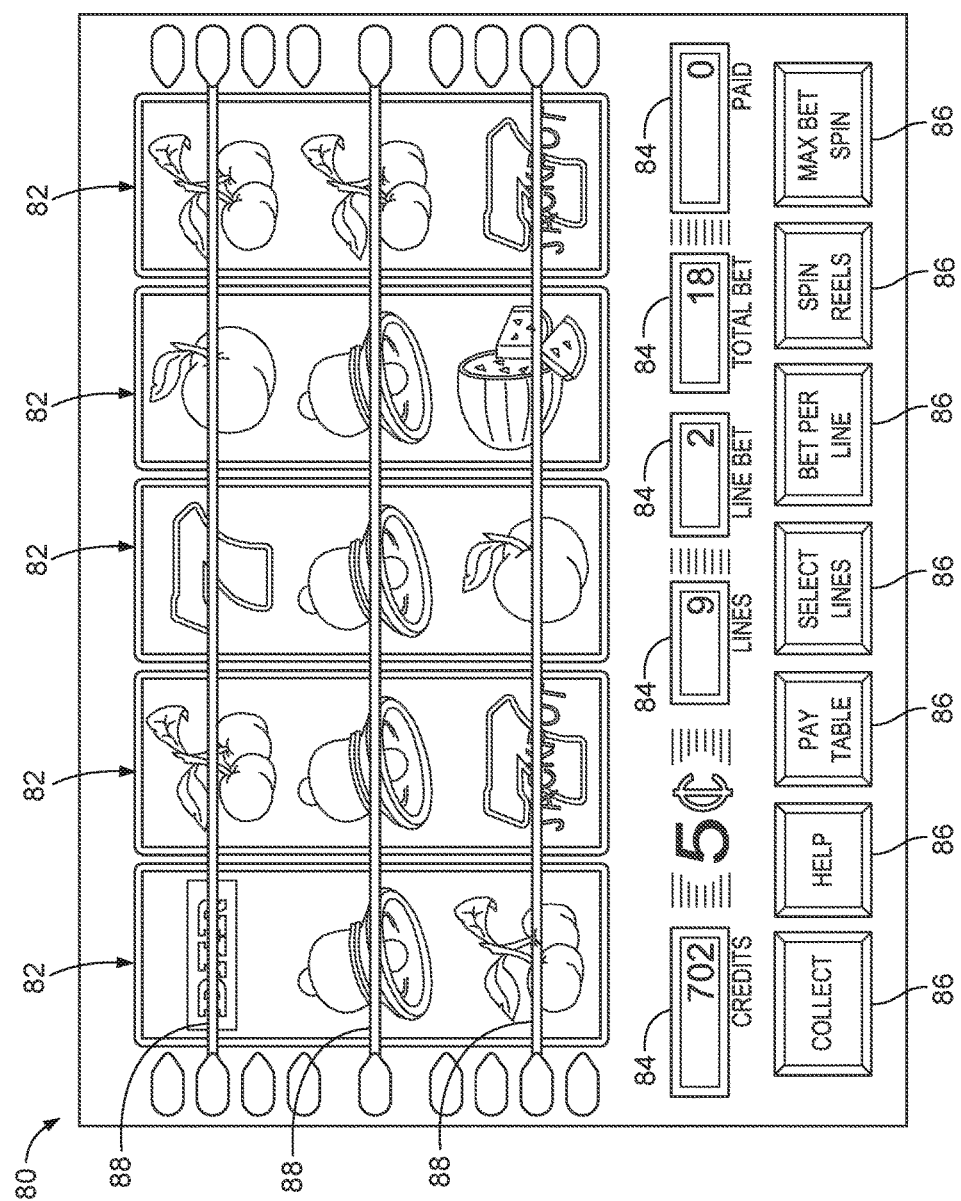
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for security and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions.

Figure 4D:
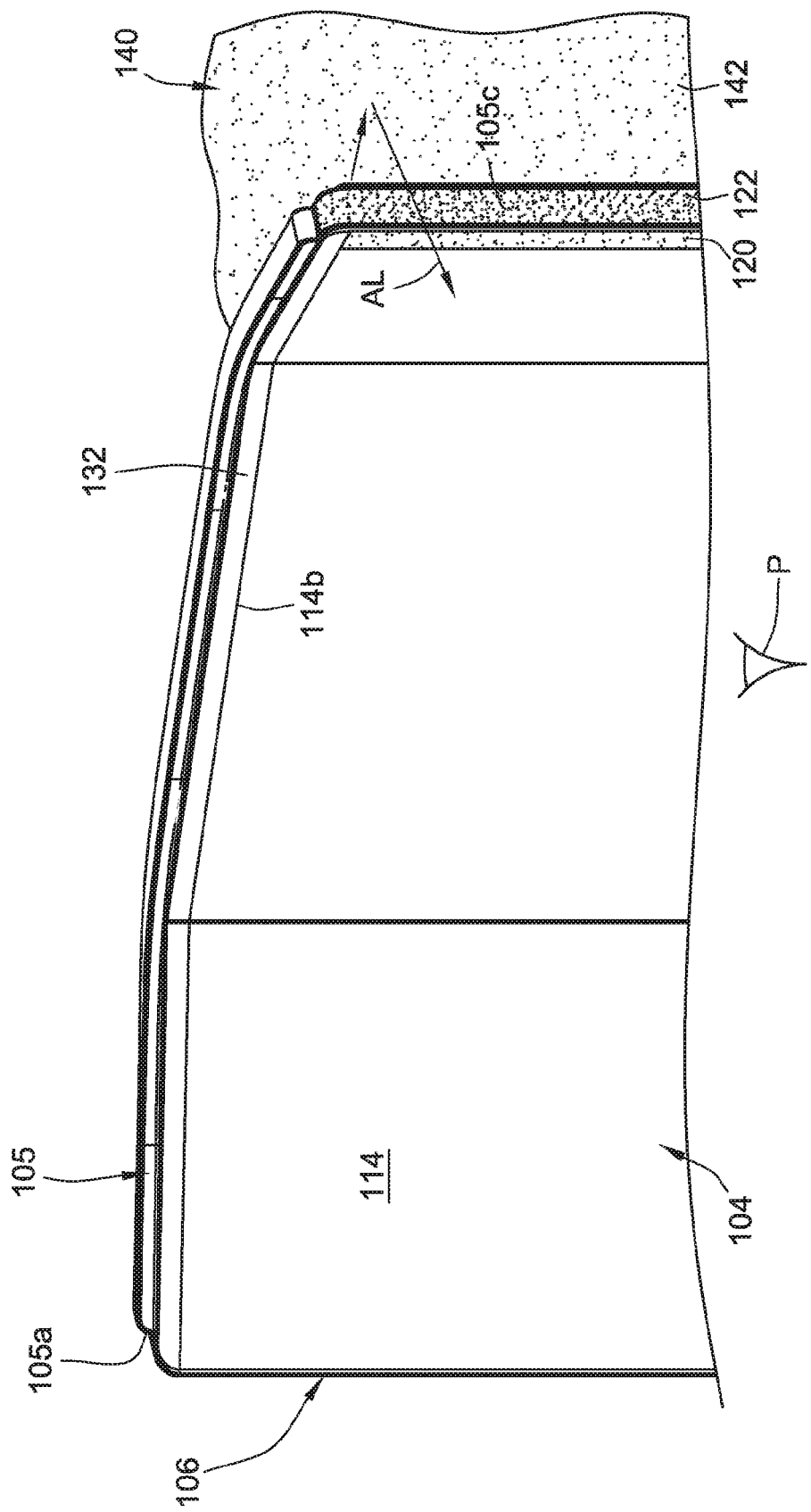
FIG. 4D is a partial perspective view illustrating rear lighting of the gaming machine of FIG. 4A.

Referring generally to FIGS. 4A-4D, a gaming machine 100 (partially shown) is primarily dedicated to playing at least one casino wagering game, and includes a gaming cabinet 102 and a display area 104. The display area 104 includes at least one electronic display device 105 and a plurality of emotive lighting areas, including a vertical lighting area 106 and a horizontal lighting area 108. The gaming machine 100 is similar to or identical with the gaming machine 10 illustrated and described above in reference to FIGS. 1-3. Although, for clarity and ease of understanding, the description below refers to a single electronic display device 105, it is understood that in other embodiments the display area 104 includes three electronic display devices (e.g., located adjacent to each other, as illustrated in FIG. 4A, and forming a unified image to show the appearance of a seamless electronic display device).

The electronic display device 105 is located within a display housing of the cabinet 102 and is configured to display the casino wagering game. The electronic display device 105 is defined by a plurality of display edges that includes a left display edge 105a, a top display edge 105b, a right display edge 105c, and a bottom display edge 105d. The left display edge 105a and the top display edge 105b are symmetrical, respectively, to the right display edge 105c and the bottom display edge 105d, and are further illustrated in FIG. 6.

The electronic display device 105 includes an active area 114 with an image surface in which images of the casino wagering game are displayed, and an inactive bezel area 116 (shown in FIG. 5) that lacks any display of images. The active area 114 is defined by a plurality of active edges that includes a left active edge 114a, a top active edge 114b, a right active edge 114c, and a bottom active edge 114d. The inactive bezel area 116 is directly adjacent to the active area 114 and is generally viewable as an imageless border surrounding the active area 114 when images are displayed by the electronic display device 105.

Referring more specifically to FIG. 4B, the vertical lighting area 106 is within the gaming cabinet 102 and includes a diffused lighting area 120 and a bright lighting area 122. The diffused lighting area 120 is directly adjacent to the active area 114, and the bright lighting area 122 is directly adjacent to the diffused lighting area 120. As described in more detail below, the diffused lighting area 120 forms a border with diffused light adjacent to and in seamless transition with the active area 114 of the electronic display device 105. In a similar manner, the bright lighting area 122 forms a border with bright light adjacent to and in seamless transition with the diffused lighting area 120. The bright light is viewable, from a player position P in front of the gaming machine 100, as light that is brighter than the diffused light.

Referring more specifically to FIG. 4C, the horizontal lighting area 108 is within the gaming cabinet 102 and includes a bright lighting area 130 directly adjacent to a masked area 132 of the electronic display device 105. The masked area 132 forms a horizontal band lacking images along the top display edge 105b of the electronic display device 105. Thus, the masked area 132 is a horizontal counterpart of the (vertical) inactive bezel area 116. A symmetrical masked area 132 is formed along the bottom display edge 105d of the electronic display device 105.

The horizontal lighting area 108 further includes a diffused lighting area 134 that is directly adjacent to the bright lighting area 130. The bright lighting area 130 forms a border of bright light between and directly adjacent to the masked area 132 and the diffused lighting area 134. Similar to the lighting areas of the vertical lighting area 106, the light of the bright lighting area 130 is viewable as light that is brighter than diffused light of the diffused lighting area 134. However, in contradistinction to the vertical lighting area 106 (and in accordance with this exemplary embodiment), the bright lighting area 130 of the vertical lighting area 106 is located between the active area 114 and the diffused lighting area 134.

Although the above general description above describes for brevity purposes a left vertical lighting area 106 and a top horizontal lighting area 108, the gaming machine 100 includes at least two additional lighting areas. The additional lighting areas are respectively and symmetrically located along a right edge and a bottom edge of the electronic display device 105. The vertical lighting areas form vertical borders that extend across the full width W of the display area 104.

Referring more specifically to FIG. 4D, the gaming cabinet 102 includes a rear wing 140 having a front surface 142 for receiving rear light RL emitted from within the display housing of the electronic display device 105, as described below in the exemplary embodiment of FIG. 10. Optionally, the rear wing 140 and the front surface 142 are identical or similar to the rear wing 13 and the front surface 14, respectively, illustrated in FIG. 1. The rear wing 140 is positioned rearward of the electronic display device 105 relative to the player position P. The front surface 142 receives the rear light RL and reflects at least a portion of it towards the player position P as back ambience light AL.

Referring generally to FIGS. 5A-7, the vertical lighting area 106 forms a housing for the electronic display device 105 and includes a front glass 150, a diffuser 152, a very high bond (VHB) tape 154, a mounting bracket 156, a light-emitting diode (LED) board bracket 158, an LED board 160, an LED light source 161, a front light pipe 162, a rear light pipe 164, and a shell 166. The front glass 150 is the component closest to the player position P and covers internal components, including the diffuser 152 and the electronic display device 105. As such, the front glass 150, which is attached to the electronic display device 105 via the VHB tape 154, extends across the width W of the display area 104, including overlapping both the electronic display device 105 and the diffuser 152. The diffuser 152 is mounted behind the front glass 150 (as viewed from the player position P) and overlaps in part with the electronic display device 105, which is mounted rearward of the diffuser 152 relative to the player position P.

The LED light source 161 is mounted on the LED board 160, which is mounted via the LED board bracket 158 rearward of the electronic display device 105. Thus, the LED light source 161 is a light source that is concealed from view relative to the player position P, which is in front of the gaming cabinet 102. The LED light source 161 is physically and optically coupled with the front light pipe 162 via which emitted light is transmitted towards the diffuser 152. The rear light pipe 164 receives light either from the LED light source 161 or from a different light source, and transmits the light as the rear light RL illustrated in FIG. 4D, as discussed above.

Figure 5B:
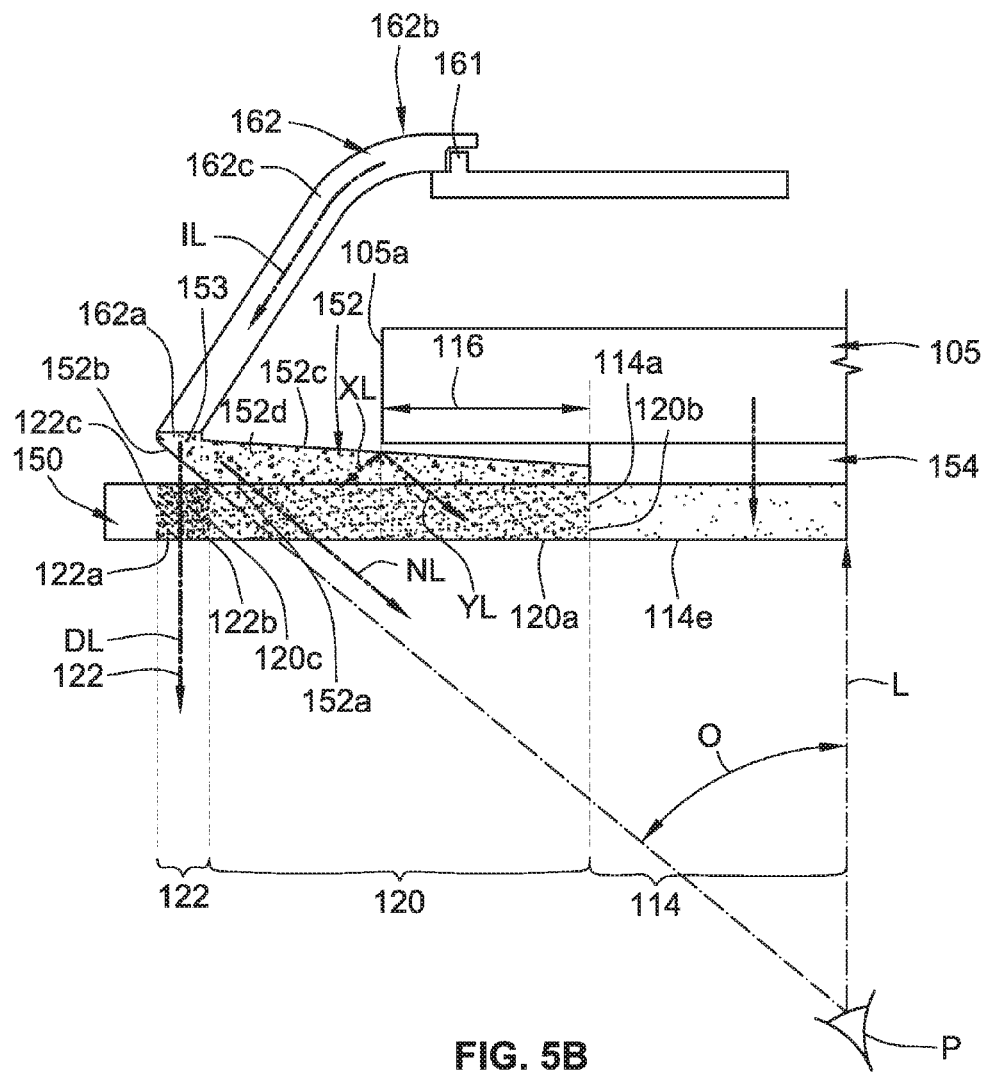
FIG. 5B is a top view illustration of features illustrated in FIG. 5A.
Figure 7:
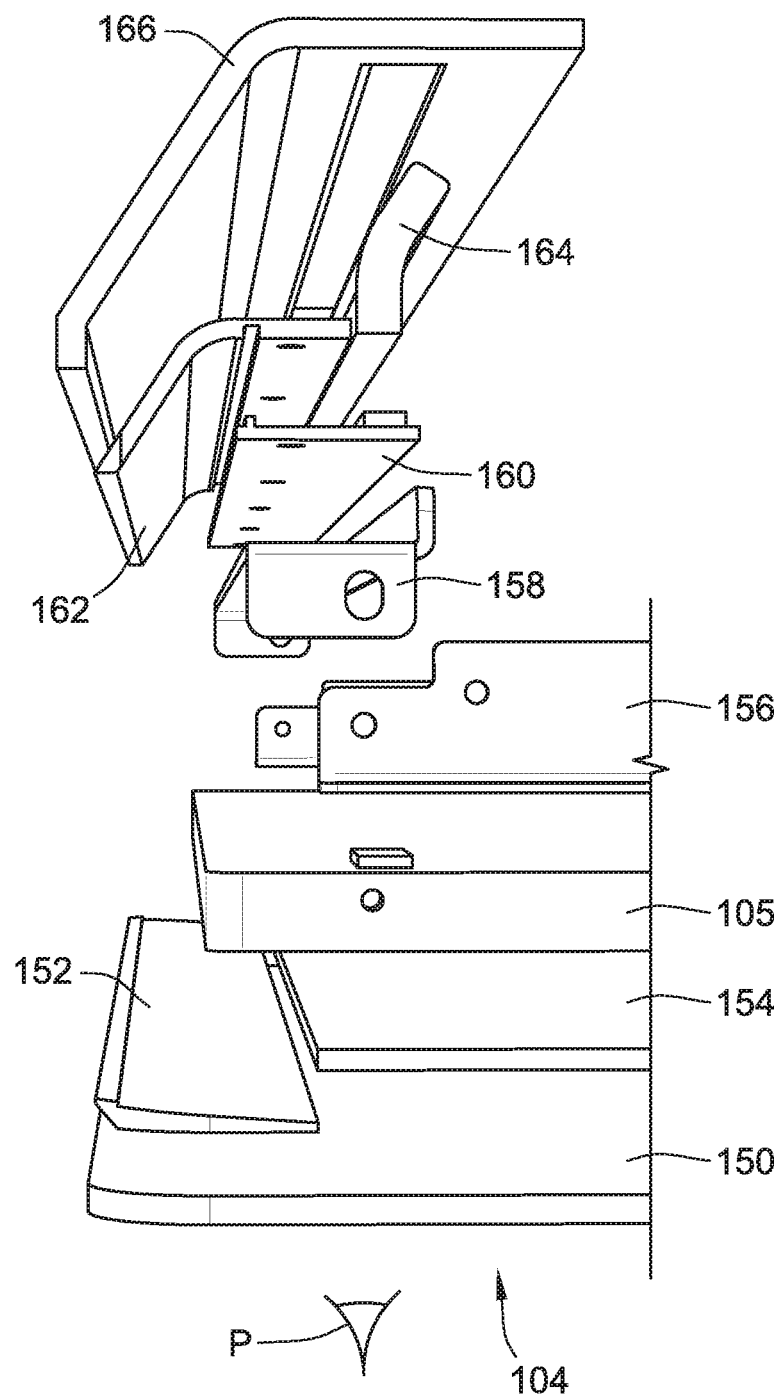
FIG. 7 is an exploded side-perspective view of the illustration of FIG. 6.

Referring more specifically to FIG. 5B, the three illuminated areas are more clearly illustrated adjacent to each other, with the active area 114 being generally centrally located and directly adjacent to the diffused lighting area 120, which is directly adjacent to the bright lighting area 122. Although each of these three areas appear co-planar, as viewed from the player position P along the surface of the front glass 150, different components (which are not necessarily co-planar with each other) contribute to the images viewed from the player position P along the front glass 150. By way of example, the front glass 150 is positioned forward of (or, in a different plane) than the diffuser 152, which is positioned forward of the electronic display device 105.

The diffused lighting area 120 has a front diffused surface 120a that is adjacent to an image surface 114e of the active area 114. For illustration purposes, both the front diffused surface 120a and the image surface 114e, are represented along a front surface of the front glass 150 (which overlaps the electronic display device 105 and the diffuser 152). However, it is understood that the image surface 114e of the active area 114 is in actuality behind the front glass 150 along a front surface of the electronic display device 105. The front diffused surface 120a overlaps the inactive bezel area 116 and is defined by an inner diffused edge 120b and an outer diffused edge 120c, with the inner diffused edge 120b being coincident with the left active edge 114a to form a seamless transition between images (such as simulated symbol-bearing reels) displayed on the image surface 114e and indirect light NL of the front diffused surface 102a, as described below in more detail. The edges are deemed to be coincident when viewed from the player position P, regardless of whether respective components are co-planar with each other.

As explained in more detail below, the diffused lighting area 120 receives at least some of emitted initial light IL and transmits it through the front diffused surface 120a towards the player position P as indirect (or, non-direct) light NL at an oblique angle O relative to the image surface 114e of the active area 114. The indirect light NL is viewed as the diffused (or less-bright) ambient light.

By way of further example, the bright lighting area 122 has a front bright surface 122a that is adjacent to and generally co-planar with the front diffused surface 120a. As explained in more detail below, the bright lighting area 122 receives at least some of the initial light IL and transmits it through the front bright surface 122a towards the player position P as direct light DL at an angle generally perpendicular to the image surface 114e of the active area 114. In other words, the direct light DL is generally parallel to the line of sight L between the player position P and the image surface 114e. The front bright surface 122a is defined by an inner bright edge 122b and an outer bright edge 122c, the inner bright edge 122b being coincident with the outer diffused edge 120c to form a seamless transition between the indirect light NL of the front diffused surface 120a and the direct light DL of the front bright surface 122a. According to the illustrated exemplary embodiment, the front bright surface 122a has a smaller width than the front diffused surface 120a

To facilitate the transmission of the initial light IL, the diffuser 152 has a front planar surface 152a with an edge adjoining a front angled surface 152b, which is oriented at the oblique angle O towards the player position P. The front planar surface 152a is generally perpendicular to a line of sight L between the player position P and the image surface 114e of the active area 114. The front planar surface 152a is further mounted flush with a rear surface of the front glass 150. The diffuser 152 further has a rear surface 152c with an edge adjoining the front angled surface 152c. The front planar surface 152a and the front angled surface 152b define, in part, an internal area 152d of the diffuser. Optionally, the rear surface 152c includes a reflector film that receives and reflects at least some internal light XL of the initial light IL (which bounces within the internal area 152d) by re-directing the internal XL light as re-directed light YL towards the front planar surface 152a. Optionally, yet, the internal area 152d consists of a material that includes microspheres 153 that facilitate the re-direction of the internal light XL towards the rear surface 152c and/or the front planar surface 152a.

The LED light source 161 emits the initial light IL that is transmitted towards the diffuser 152 for being viewed as ambient light in both the diffused lighting area 120 and the bright lighting area 122. The initial light IL is transmitted via the front light pipe 162 which has a front end 162a, a light-receiving area 162b, and a pipe section 162c extending there-between. The light-receiving area 162b is positioned adjacent to the LED light source 161 to directly receive the initial light IL emitted by the LED light source 161. The initial light IL travels through the front light pipe 162 from the light-receiving area 162b, through the pipe section 162c and exits through the front end 162a into the diffuser 152.

The front angled surface 152b of the diffuser 152 directs at least some of the initial IL light as re-directed light passing through the internal area 152d of the diffuser 152. The re-directed light is transmitted through the front planar surface 152a towards the player position P as the indirect light NL. The indirect light NL is optionally transmitted at the oblique angle O or at some other oblique relative to the image surface of the active area 114.

Referring to FIGS. 8A and 9, the horizontal lighting area 108 illustrated in FIG. 4A optionally or alternatively has contour lighting that follows a top curve formed by the display area 104, such as, for example, when the display area 104 includes three electronic display device 105. The contour lighting is achieved by using a spacer 170, a left LED board 172, a middle LED board 173, a right LED board 174, a contour light pipe 176, a diffuser 178, and an LED light source 180 (which is located at a distance X from a front diffuser surface 178a).

The contour lighting includes three sections, generally referred to as the left, middle, and right sections, which are, respectively, in accordance with the left, middle, and right LED boards 172-174. The contour light pipe 176, the diffuser 178, and the LED light source 180 provides emotive lighting that follows the contour of each section. In other words, each section along LED boards 172-174 is designated to follow the contour of a respective electronic display device 105 and to provide illumination that includes a diffused lighting area 182.

The diffused lighting area 182 is formed with light that is emitted by LEDs of the LED boards 172-174 and that is communicated via the contour light pipe 176 to the diffuser 178. Furthermore, the spacer 170 is configured to provide a desired non-illuminated area 184, which is located between the diffused lighting area 182 and a top area of the electronic display device 105. Optionally, the diffused lighting area 182 is similar or identical to the diffused lighting area 134 illustrated in FIG. 4C, and the contour light pipe 176 and the diffuser 178 are configured and function similar to the respective components described above, e.g., the front light pipe 162, the rear light pipe 164, and the diffuser 152.

Referring to FIG. 8B, instead of the contour lighting illustrated in FIG. 8A, the horizontal lighting area 108 optionally or alternatively has an alternative configuration that includes one or more modified LED boards 173', a modified contour light pipe 176', a modified diffuser 178', and a modified LED light source 180'. The modified configuration has a geometry in which the modified diffuser 178', in particular, has a slimmer and more contoured profile than the diffuser 178 illustrated in the embodiment shown in FIG. 8A. Additionally, the contact between the modified diffuser 178' and the modified contour light pipe 176' includes a notched area 179' that facilitates an enhanced interface between these two components. The enhanced interface has two contact surfaces, which include a lower contact surface 182' and an upper contact surface 183'.

Furthermore, the modified LED light source 180' is positioned at a distance X' from a front diffuser surface 178a'. The distance X' is greater than the distance X by which the LED light source 180 is positioned from the front diffuser surface 178a in the embodiment illustrated in FIG. 8A. In general, the geometry of the alternative contour lighting helps achieve a more diffuse and blended ambient light than the contour lighting of FIG. 8A.

Referring to FIG. 10, according to an alternative embodiment, the vertical lighting area 106 has a configuration in which the front light pipe 162 and the rear light pipe 164 have been replaced by a single light pipe 190, and in which the single LED light source 161 has been replaced by a front LED light source 192 and a rear LED light source 194. The front glass 150, the diffuser 152 and the electronic display device 105 remain generally the same in both embodiments.

The front LED light source 192 and the rear LED light source 194 are both concealed from view relative to the player position and emit, respectively, a front initial light F-IL and a rear initial light R-IL. The front initial light F-IL emitted from the front LED light source 192 is optically communicated to the diffuser 152 and is transmitted towards the player position P as the direct light DL and the indirect light NL, as described in more detail above in reference to FIG. 5B.

The rear initial light R-IL is emitted from the rear LED light source 194 into a rear light-receiving area 195 and is optically communicated to a rear end 196 of the light pipe 190 via a rear pipe section 197. The rear initial light R-IL is, then, transmitted as rear light RL onto a front surface 198 of a rear structure 199. The front surface 198, which is optionally similar or identical to the front surface 142 of the rear wing 140, reflects the rear light RL to be visible as back ambience light AL from the player position P. The rear structure 199 is at least in part overlapping with the vertical lighting area 106.

The front LED light source 192 is mounted on a front LED board 193, and the rear LED light source 194 is mounted on a rear LED board 200. Either or both of the LED boards 193, 200 are printed circuit boards (PCBs) on which side-firing LEDs are mounted as the respective LED light sources 192, 194. Optionally, the side-firing LEDs of the front LED light source 192 are mounted at a first pitch along the front LED PCB 193, and the side-firing LEDs of the rear LED light source 194 are mounted at a second pitch along the rear LED PCB 200. Optionally, yet, the first pitch is smaller than the second pitch to facilitate a brighter and focused front ambient light than a dimmer and unfocused rear ambient light.

Referring to FIGS. 11A-11C, the active area 114 and the vertical lighting area 106 are configured to achieve a seamless integration between images displayed in the active area 114 by the electronic display device 105 and the emotive lighting formed by the vertical lighting area 106. Referring specifically to FIG. 11B, the seamless integration is achieved along a line 210, which in accordance with some embodiments is invisible (or barely visible) when the images and the emotive lighting are displayed. Referring specifically to FIG. 11C, the diffuser 152 extends to and is directly adjacent with the active area 114, with the inactive bezel area 116 being overlapped by the diffuser 152 in a position forward of the electronic display device 105.

Figure 12:
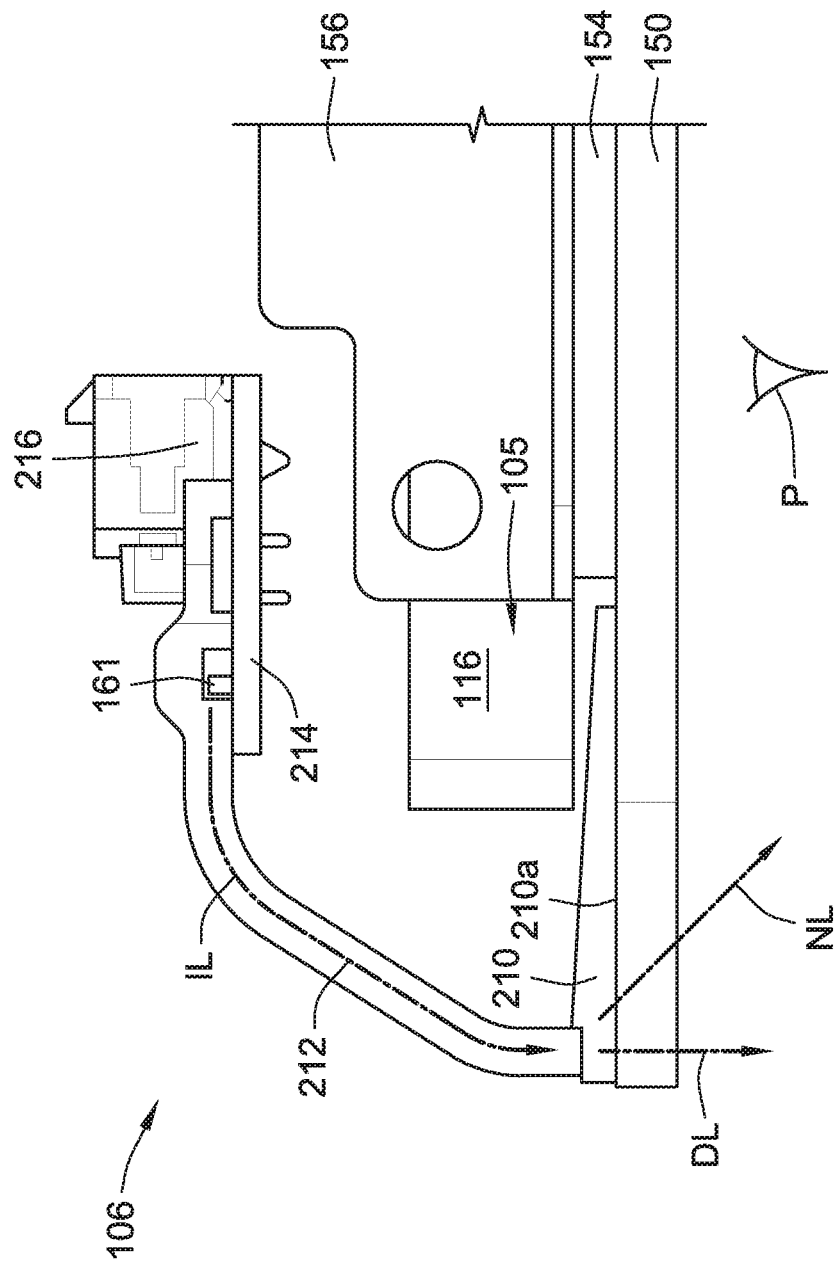
FIG. 12 is a top view illustration of the emotive lighting area of FIG. 11A.
Figure 13A:
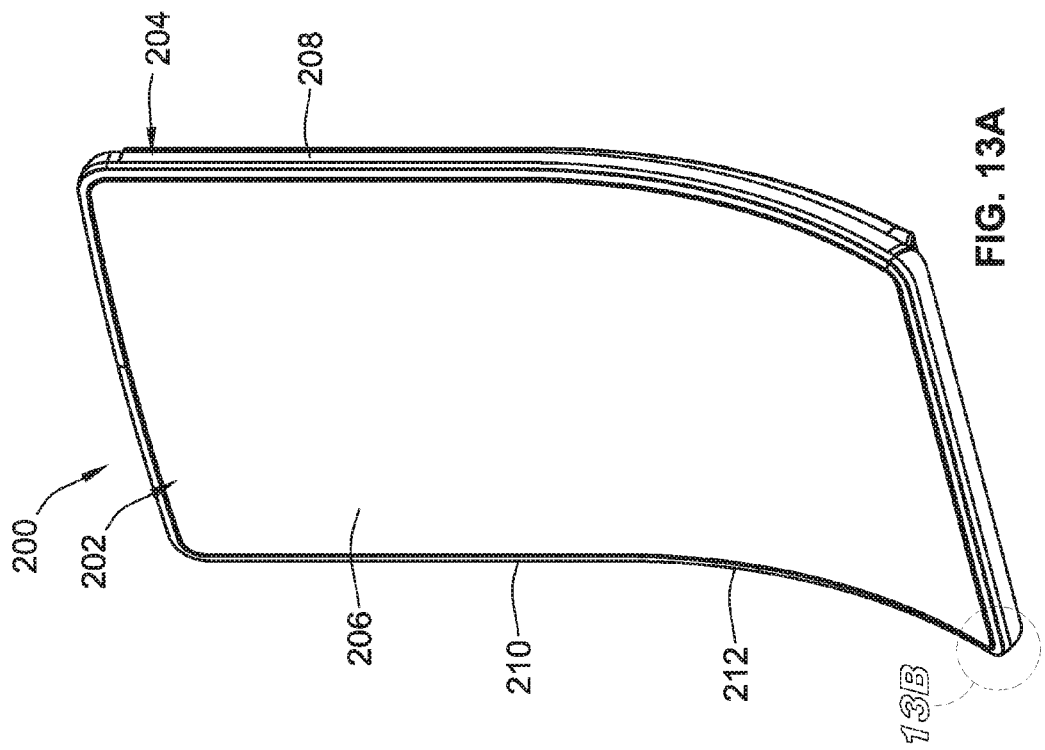
FIG. 13A is a perspective view of a display for a gaming machine, according to another embodiment of the present invention.
Figure 13B:
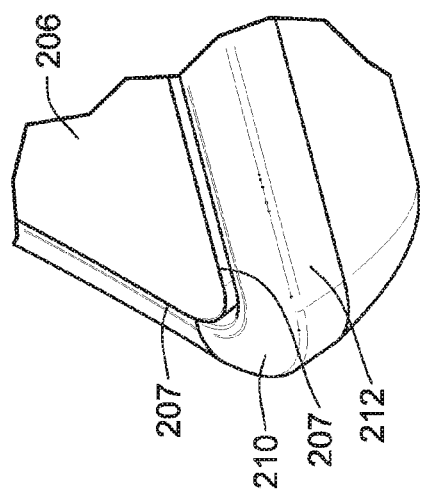
FIG. 13B is an enlarged view showing an emotive lighting area of the display shown in FIG. 13A.

Referring to FIG. 12, according to an alternative embodiment, the vertical lighting area 106 has an alternative configuration that includes a modified diffuser 210 and a modified light pipe 212. The modified diffuser 210 has a single front planar surface 210a, lacking a front angled surface similar to the front angled surface 152b illustrated in FIG. 5B. The modified diffuser 210 is not directly adjacent to the VHB tape 154, but is offset by a small distance. Regardless, the modified diffuser 210 is positioned to overlap the inactive bezel area 116 of the electronic display device 105 similar to the position of the diffuser 152 illustrated in FIGS. 5A and 5B.

The modified light pipe 212 has a cantilevered configuration in which the LED light source 161 is generally suspended and detached over the mounting bracket 156. The LED light source 161 is further mounted on an LED board 214, which receives power and/or signals from a power/signal connector 216. The LED light source 161 emits the initial light IL which is viewable, via the modified diffuser 210, as both direct light DL and indirect light NL.

Referring to FIGS. 13A-16, a display 200 is configured for use in a gaming machine having a gaming cabinet, such as the gaming machine 10 and gaming cabinet 12 described above in reference to FIGS. 1-3. The display 200 includes an electronic display device 202 that is within a cabinet enclosure 204 and has an active area 206. The cabinet enclosure 204 has a peripheral edge 208 that generally surrounds the electronic display device 202. According to the illustrated embodiment, the cabinet enclosure 204 forms a portion of the display 200.

The active area 206 shows images of a casino wagering game, such as the images described above in reference to FIG. 3 (e.g., the image of a basic-game screen 80). The active area 206 is generally defined by a plurality of active edges 207 and is adjacent to a masked area 210, which lacks any display of the images of the casino wagering game. The display 200 further includes a diffused lighting area 212 that is adjacent to the masked area 210 and which extends to overlap the adjacent peripheral edge 208 of the cabinet enclosure. Together, the diffused lighting area 212 and the masked area 210 form an emotive lighting area.

Figure 17:
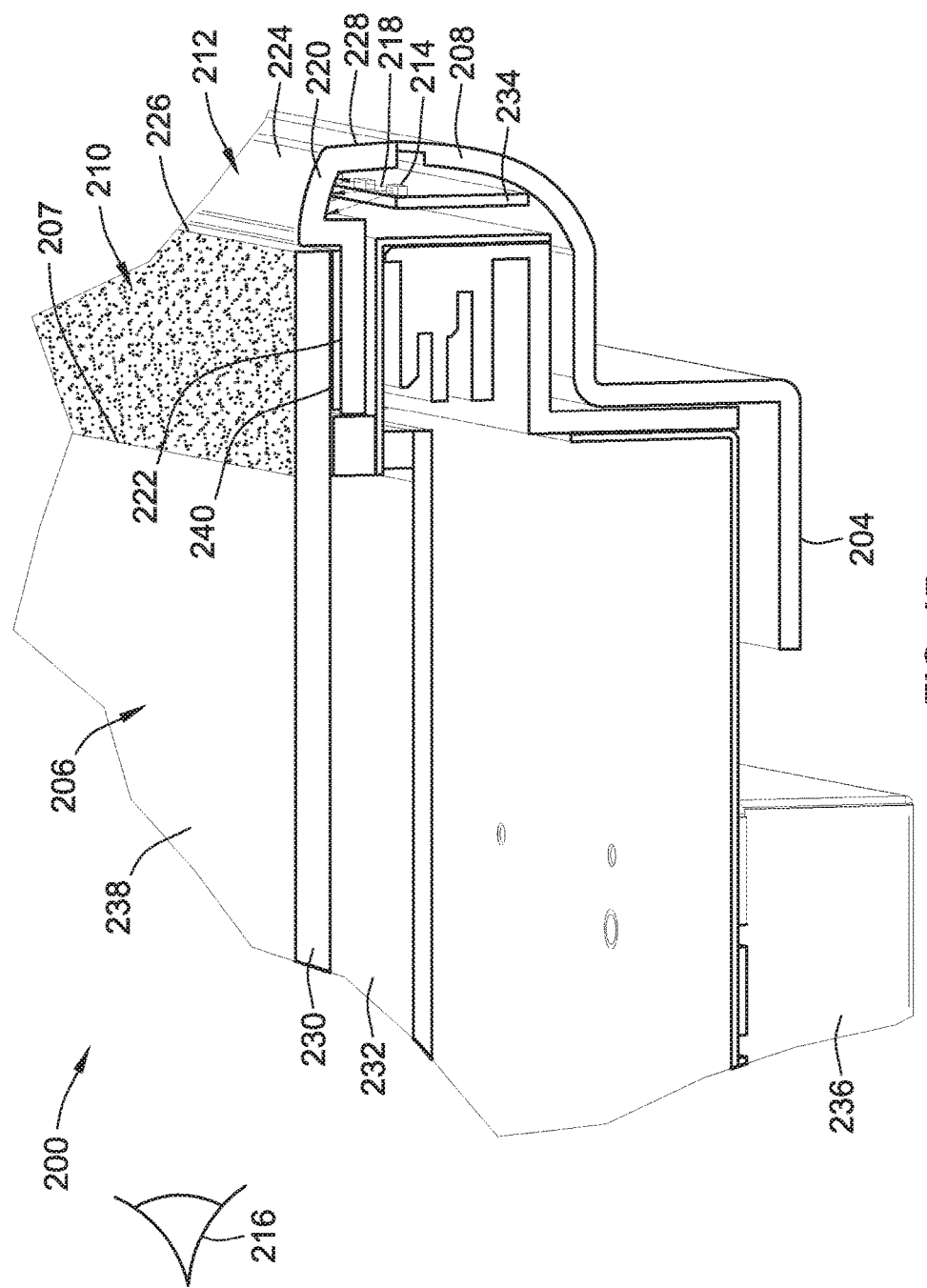
FIG. 17 is a right partial cross-sectional illustration of the display shown in FIG. 13A.

Referring to FIGS. 17 and 18, the diffused lighting area 212 includes a light source 214 that is concealed from view relative to a player position 216 in front of the gaming cabinet to which the display 200 is mounted. The light source 214, which optionally includes one or more light-emitting diodes (LEDs), emits an initial light 218 that is received by a single diffuser 220.

The single diffuser 220 is shaped such that it wraps around at least two non-parallel surfaces. According to the illustrated embodiment, the single diffuser 220 has a first top surface 222 that extends below the masked area 210 and a second top surface 224 that extends away from a common edge 226, which is between the masked area 210 and the diffused lighting area 212.

The single diffuser 220 further has an external side 228 that extends perpendicularly from the second top surface 224 towards the adjacent peripheral edge 208 of the cabinet enclosure 204. According to one example, the external side 228 forms a seamless connection with the adjacent peripheral edge 208 of the cabinet enclosure 204.

According to one embodiment, the second top surface 224 is generally flush (or-coplanar) with the masked area 210. According to an alternative embodiment, the second top surface 224 is elevated, at least in part, relative to the masked area 210.

The display 200 further includes a glass 230, a liquid crystal display 232, a printed circuit board (PCB) 234, and a plurality of electronic components 236. The glass 230 defines a top surface 238 of the active area 206 that provides a continuous glass surface overlapping both the active area 206 and the masked area 210. Thus, for example, if the second top surface 224 of the single diffuser 220 is elevated relative to the masked area 210, in effect the second top surface 224 is elevated relative to the top surface 238. The images of the casino wagering game, which, according to one example, are displayed via the liquid crystal display 232, are visible through the glass 230 that overlaps the liquid crystal display 232. As such, the active area 206 has an image surface that can include either of the top surface 238 (through which the images are visible) or a top surface of the liquid crystal display 232 (via which the images are transmitted and which represents the visible screen portion of the liquid crystal display 232).

The glass 230 has a bottom printed surface 240 along the masked area 210, which provides a masked effect in which light is completely prevented from passing through the glass 230 along the masked area 210 (e.g., to provide an opaque black border surrounding the active area 206), or in which various light patterns pass through the glass 230 along the masked area 210 (e.g., to provide a half-tone gradation consisting of black and transparent, black-and-translucent white and/or opaque and translucent color border patterns surrounding the active area 206). Thus, the initial light 218 emitted by LEDs 214 is either completely blocked by the bottom printed surface 240 along the masked area 210 or is partially blocked to provide a pattern light effect.

Figure 19B:
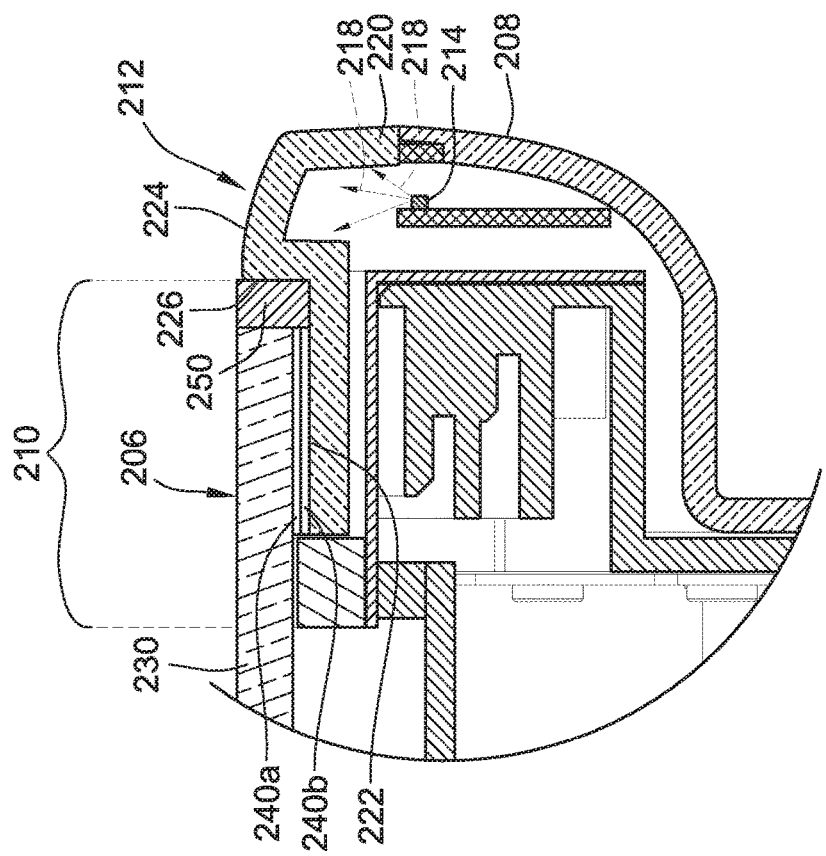
FIG. 19B is an enlarged cross-sectional illustration of the portion of the display shown in FIG. 19A.
Figure 19A:
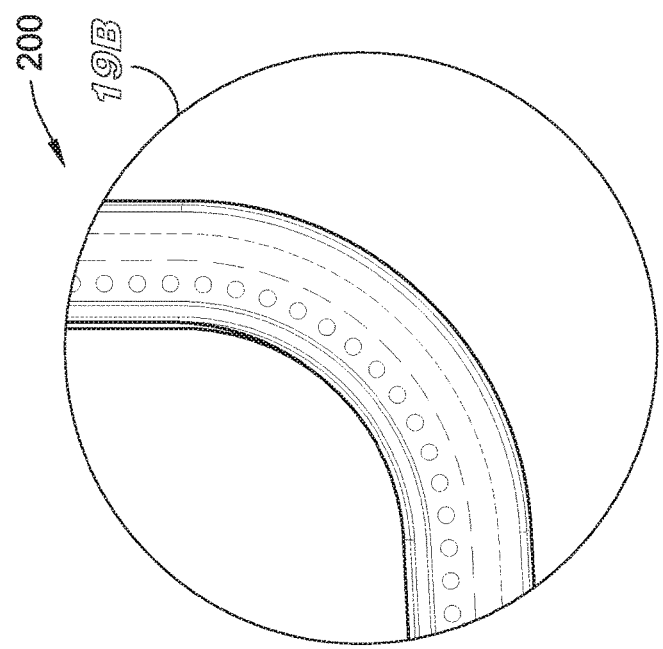
FIG. 19A is a front view illustration of a portion of the display shown in FIG. 13A having a printed pattern, according to a further embodiment of the present invention.

Referring to FIGS. 19A and 19B, the bottom printed surface optionally includes one or more layers 240a, 240b, with each layer having a different printed pattern. The pattern combinations provide various emotive lighting effects and visual effect interplay in the masked area 210 and the diffused lighting area 212. According to one example, the printed pattern includes one or more of a gradated pattern, a black-and-white pattern, and a color pattern. According to another example, the printed pattern is opaque black with an inner border that is solid and which forms a frame around the active area 206, segregating images of the casino wagering game from lighting effects of the diffused lighting area 212. According to yet another example, the printed pattern has a gradation pattern that extends completely between the active area 206 and the diffused lighting area 212, with colors including a silver-mirror pattern, a translucent pattern, and a tinted pattern. The printed pattern optionally interacts with various colors of the light 218. By way of example, images displayed on the active area 206 match the lighting color viewed through the masked area 210 and/or the diffused lighting area 212 for a borderless lighting effect.

Alternative to the wrap-around effect achieved by the diffuser 220, with light emitted both through the second top surface 224 and the external side 228, an opaque trim 250 is positioned adjacent to the glass 230, in addition to or instead of the diffuser 220. The opaque trim 250 prevents light being emitted through the side, i.e., light that would otherwise be transmitted parallel to the image surface 238 such as through the external side 228 of the diffuser 220.

One benefit of the diffused lighting area 212, including the diffuser 220, is that it provides a larger perimeter lighting area, relative to the active area 206, creating a multi-sided object with surfaces that wrap around changing directions and increasing a viewable angle range of the lighting features. For example, the initial light 218 is transmitted through both the second top surface 224 and the external side 228 of the diffuser 220 to provide a multi-sided viewable effect.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A gaming machine comprising:
   a gaming cabinet having a cabinet enclosure with a peripheral edge;
   an electronic display device within the cabinet enclosure having an active area with an image surface, the image surface being defined by a plurality of active edges and configured to display images of a casino wagering game;
   a masked area adjacent to the active area and lacking any display of the images of the casino wagering game, the masked area including a bottom printed surface comprising a plurality of layers, each layer of the plurality of layers having a different printed pattern;
   a light source concealed from view relative to a player position in front of the gaming cabinet and emitting an initial light; and
   a diffused lighting area adjacent to the masked area and extending to overlap an adjacent peripheral edge of the cabinet enclosure, the diffused lighting area including a single diffuser that receives the initial light and transmits it towards the player.

2. The gaming machine of claim 1, wherein the single diffuser wraps around at least two non-parallel surfaces.

3. The gaming machine of claim 2, wherein the single diffuser includes a first top surface that extends below the masked area and a second top surface that extends away from a common edge between the masked area and the diffused lighting area.

4. The gaming machine of claim 3, wherein the single diffuser further has an external side that extends perpendicularly from the second top surface towards the adjacent peripheral edge of the cabinet enclosure.

5. The gaming machine of claim 4, wherein the external side forms a seamless connection with the adjacent peripheral edge of the cabinet enclosure.

6. The gaming machine of claim 2, wherein the second top surface is elevated, at least in part, relative to the masked area.

7. The gaming machine of claim 1, further including a continuous glass surface overlapping both the active area and the masked area, the diffused lighting area having at least one surface that is elevated relative to the continuous glass surface.

8. The gaming machine of claim 1, wherein the bottom printed surface includes a printed pattern selected from a group consisting of a gradated pattern, a black-and-white pattern, and a color pattern.

9. The gaming machine of claim 1, wherein the single diffuser has a surface that extends and overlaps below a bottom printed surface of the masked area.

10. A gaming machine comprising:
a gaming cabinet with a peripheral edge;
an electronic display device within the cabinet, the display device including an active area configured to display images of a casino wagering game;
a masked area immediately adjacent to the active area and forming at least in part an imageless, opaque border around the active area;
a glass component with a common surface overlapping both the active area and the masked area, wherein the masked area includes a bottom printed surface of the glass component, the bottom printed surface formed by a plurality of layers, each layer of the plurality of layers having a different printed pattern;
a light source concealed from view relative to a player position in front of the gaming cabinet and emitting an initial light and
a single diffuser forming a diffused lighting area and extending between the glass component and an adjacent peripheral edge of the gaming cabinet, the single diffuser having a first surface that extends in an overlapping manner below the glass component and a second surface that is at least in part elevated relative to the common surface of the glass component.

11. The gaming machine of claim 10, wherein the first surface is connected to the second surface via a connecting third surface that is perpendicular to the first surface.

12. The gaming machine of claim 10, wherein the first surface is parallel to and below the common surface of the glass component.

13. The gaming machine of claim 10, wherein the second surface is angled relative to the common surface of the glass component, an adjacent edge between the second surface and the common surface being elevated relative to the common surface, an external edge of the second surface being lower than the common surface.

14. The gaming machine of claim 10, wherein the single diffuser has an external surface that is perpendicular to the common surface of the glass component and in seamless, parallel connection with the adjacent peripheral edge of the gaming cabinet.

15. The gaming machine of claim 10, wherein the bottom printed surface forms a border pattern through which visual effects from the diffused lighting area are presented.

16. The gaming machine of claim 10, further comprising a light source having one or more light-emitting diodes, the light source being concealed from view relative to a player position in front of the gaming cabinet and emitting an initial light, the single diffuser receiving the initial light and transmitting it towards the player.

* * * * *